US012699352B2

(12) United States Patent
Shao et al.

(10) Patent No.: US 12,699,352 B2
(45) Date of Patent: Aug. 4, 2026

(54) PROCESS CARTRIDGE CHIP AND PROCESS CARTRIDGE

(71) Applicant: Zhuhai Pantum Electronics Co., Ltd., Zhuhai (CN)

(72) Inventors: Zhe Shao, Zhuhai (CN); Xiangchao Xia, Zhuhai (CN); Xing Peng, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/507,954

(22) Filed: Nov. 13, 2023

(65) Prior Publication Data

US 2024/0160145 A1 May 16, 2024

(30) Foreign Application Priority Data

Nov. 14, 2022 (CN) ......................... 202211431308.2

(51) Int. Cl.
*G03G 21/18* (2006.01)
*B41J 2/175* (2006.01)
*G03G 21/16* (2006.01)

(52) U.S. Cl.
CPC ........ *G03G 21/1867* (2013.01); *B41J 2/1753* (2013.01); *G03G 21/1652* (2013.01);
(Continued)

(58) Field of Classification Search
CPC ........... G03G 21/1867; G03G 21/1875; G03G 21/1885; G03G 21/1652; G03G 2221/166;
(Continued)

(56) References Cited

U.S. PATENT DOCUMENTS 6,000,773 A 12/1999 Murray et al.
7,125,100 B2 10/2006 Ishizawa et al.
(Continued)

FOREIGN PATENT DOCUMENTS

CN 1459673 A 12/2003
CN 101390019 A 3/2009
(Continued)

OTHER PUBLICATIONS

The European Patent Office (EPO) The Extended European Search Report for 23209300.5, Mar. 18, 2024 8 Pages.

*Primary Examiner* — Stephanie E Bloss
*Assistant Examiner* — Laura Roth
(74) *Attorney, Agent, or Firm* — Anova Law Group, PLLC

(57) ABSTRACT

The present disclosure provides a process cartridge chip and a process cartridge. The process cartridge is detachably installed on a main body of an image-forming apparatus. The process cartridge chip includes a first grounding portion and a second grounding portion electrically connected to the first grounding portion. The first grounding portion is connected to a reference-ground supply part disposed at the main body of the image-forming apparatus by electrically connecting to a first connecting part, in order to be connected to a potential reference point provided by the reference-ground supply part. The second grounding portion is connected to the reference-ground supply part by electrically connecting to a second connecting part, where the first connecting part is different from the second connecting part, the second connecting part is not included in the first connecting part, and the first connecting part is not included in the second connecting part.

10 Claims, 10 Drawing Sheets

(52) U.S. Cl.
CPC ... *G03G 21/1885* (2013.01); *G03G 2221/166* (2013.01); *G03G 2221/1684* (2013.01); *G03G 2221/1823* (2013.01); *G03G 2221/1869* (2013.01)

(58) Field of Classification Search
CPC ... G03G 2221/1823; G03G 2221/1869; G03G 2221/1684; B41J 2/1753; B41J 2/17546
See application file for complete search history.

(56) References Cited

U.S. PATENT DOCUMENTS

| | | | | |
|---|---|---|---|---|
| 2008/0170110 | A1* | 7/2008 | Chan | H05K 1/117 29/829 |
| 2016/0349697 | A1 | 12/2016 | Wei et al. | |
| 2018/0181055 | A1* | 6/2018 | Itabashi | G03G 21/1676 |
| 2019/0041792 | A1* | 2/2019 | Kishi | G03G 21/1671 |
| 2020/0103790 | A1* | 4/2020 | Kishi | G03G 15/1655 |
| 2021/0072697 | A1 | 3/2021 | Yabuki et al. | |
| 2021/0325813 | A1 | 10/2021 | Zhang et al. | |
| 2024/0160145 | A1 | 5/2024 | Shao et al. | |
| 2024/0160146 | A1* | 5/2024 | Xia | G03G 21/1652 |

FOREIGN PATENT DOCUMENTS

| | | | |
|---|---|---|---|
| CN | 101645627 | A | 2/2010 |
| CN | 103472404 | A | 12/2013 |
| CN | 103839657 | A | 6/2014 |
| CN | 104602970 | A | 5/2015 |
| CN | 107599656 | A | 1/2018 |
| CN | 207889364 | U | 9/2018 |
| CN | 110658481 | A | 1/2020 |
| CN | 111523633 | A | 8/2020 |
| CN | 211942588 | U | 11/2020 |
| CN | 115268240 | A | 11/2022 |
| EP | 3001316 | A1 | 3/2016 |
| JP | 2005007893 | A | 1/2005 |
| JP | 2014058075 | A | 4/2014 |
| RU | 2604791 | C2 | 12/2016 |
| RU | 2736558 | C1 | 11/2020 |

* cited by examiner

PROCESS CARTRIDGE CHIP AND PROCESS CARTRIDGE

CROSS-REFERENCE TO RELATED APPLICATION

The present disclosure claims the priority to Chinese patent application No. 202211431308.2, filed on Nov. 14, 2022, the entirety of which is incorporated herein by reference.

TECHNICAL FIELD

The present disclosure generally relates to the field of image-forming technology and, more particularly, relates to a process cartridge chip and a process cartridge.

BACKGROUND

Currently, a process cartridge for image formation is detachably installed on an image-forming apparatus such as a printer. A process cartridge chip is installed on the process cartridge. After the process cartridge is installed on the image-forming apparatus, the process cartridge chip needs to communicate with the image-forming apparatus. The process cartridge chip is disposed with four contacts, that is, a power contact (e.g., volt current condenser VCC), a data signal contact (e.g., serial data SDA), a clock signal contact (e.g., CLK) and a grounding contact (GND). If the grounding contact of the process cartridge chip is unstable, the process cartridge chip may be damaged, thereby affecting the use of the image-forming apparatus.

SUMMARY

One aspect of the present disclosure provides a process cartridge chip installed on a process cartridge. The process cartridge is detachably installed on a main body of an image-forming apparatus. The process cartridge chip includes a first grounding portion and a second grounding portion electrically connected to the first grounding portion. The first grounding portion is connected to a reference-ground supply part disposed at the main body of the image-forming apparatus by electrically connecting to a first connecting part, in order to be connected to a potential reference point provided by the reference-ground supply part; and the second grounding portion is connected to the reference-ground supply part by electrically connecting to a second connecting part, where the first connecting part is different from the second connecting part, the second connecting part is not included in the first connecting part, and the first connecting part is not included in the second connecting part.

Another aspect of the present disclosure provides a process cartridge, detachably installed on a main body of an image-forming apparatus. The process cartridge includes a process cartridge chip and a cartridge body, where the process cartridge chip, installed on the process cartridge, includes a first grounding portion and a second grounding portion electrically connected to the first grounding portion. The first grounding portion is connected to a reference-ground supply part disposed at the main body of the image-forming apparatus by electrically connecting to a first connecting part, in order to be connected to a potential reference point provided by the reference-ground supply part; and the second grounding portion is connected to the reference-ground supply part by electrically connecting to a second connecting part, where the first connecting part is different from the second connecting part, the second connecting part is not included in the first connecting part, and the first connecting part is not included in the second connecting part.

Another aspect of the present disclosure provides a process cartridge, detachably installed on a main body of an image-forming apparatus. The process cartridge includes a process cartridge chip and a cartridge body. The process cartridge chip includes a first grounding portion; the cartridge body includes a second grounding portion; and the first grounding portion is electrically connected to the second grounding portion; the first grounding portion is connected to a reference-ground supply part disposed at the main body of the image-forming apparatus by electrically connecting to a first connecting part, in order to be connected to a potential reference point provided by the reference-ground supply part; and the second grounding portion is connected to the reference-ground supply part by electrically connecting to a third connecting part, where the first connecting part is different from the third connecting part, the third connecting part is not included in the first connecting part, and the first connecting part is not included in the third connecting part.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained according to the drawings without creative efforts.

DETAILED DESCRIPTION

Figure 1:
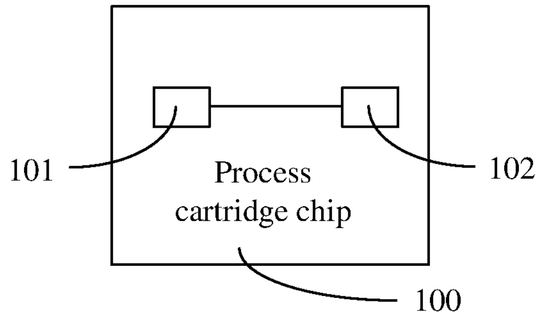
FIG. 1 illustrates a structural schematic of a process cartridge chip provided by exemplary embodiments of the present disclosure.

In order to better understand the technical solutions of the present disclosure, embodiments of the present disclosure are described in detail below with reference to accompanying drawings.

It should be understood that described embodiments are only some of embodiments of the present disclosure, rather than all of embodiments. Based on embodiments in present disclosure, all other embodiments obtained by those skilled in the art without making creative efforts should fall within the protection scope of present disclosure.

The terms used in embodiments of the present disclosure are only for the purpose of describing specific embodiments and not intended to limit the present disclosure. As used in embodiments and appended claims, the singular forms "a," "the" and "said" are also intended to include plural forms, unless the context clearly dictates otherwise.

It should be understood that the term "and/or" used in the present disclosure is only an association relationship describing related objects, indicating that there may be three relationships. For example, A and/or B may indicate three cases: A alone, both A and B, and B alone. In addition, the character "/" in the present disclosure indicate that related objects are an "or" relationship.

Before a detailed description of embodiments of the present disclosure, terms that may be applied in embodiments of the present disclosure are first defined. For a potential reference point, a certain point A in a circuit is selected as the potential reference point, which indicates that the potential at such point is configured to be zero. The potential reference point is marked with a symbol "1" in the circuit. In practice, the potential reference point is chosen to be ground potential, in other words, the ground potential is chosen to be zero potential. In electronic circuits, a common point or a housing is selected as zero potential. It should be noted that, although the potential reference point is specified to be zero potential, actual potential of such potential reference point is not necessarily zero. For the convenience of subsequent description, the connection to the potential reference point may also be referred to as "ground".

A substrate is basic material for manufacturing PCB. The substrate is a copper clad laminate (CCL). During manufacturing of single and double-sided printed boards, hole processing, chemical plating of copper, electroplating of copper, etching and other processes are selectively performed on the substrate material, that is, copper clad laminate, to obtain required circuit graphics. Another type manufacturing of multi-layer printed boards may also use inner-core thin copper clad laminate as the base substrate. Conductive pattern layers and prepregs are alternately laminated and bonded together at one time to form more than three conductive pattern layers interconnected with each other, which may have three functions including conduction, insulation and support. Performance, quality, manufacturing processability, manufacturing cost, manufacturing level and the like of printed boards largely depend on the substrate material.

Currently, a process cartridge for image formation is detachably installed on an image-forming apparatus such as a printer. A process cartridge chip is installed on the process cartridge. After the process cartridge is installed on the image-forming apparatus, the process cartridge chip needs to communicate with the image-forming apparatus. The process cartridge chip is disposed with four contacts, that is, a power contact (e.g., volt current condenser or VCC), a data signal contact (e.g., serial data or SDA), a clock signal contact (e.g., CLK) and a grounding contact (GND). If the grounding contact of the process cartridge chip is unstable, the process cartridge chip may be damaged, thereby affecting the use of the image-forming apparatus.

In order to solve above technical problems, embodiments of the present disclosure provide a process cartridge chip, a process cartridge, an image-forming apparatus and a ground detection method. Above-mentioned process cartridge chip may be installed on the process cartridge, and above-mentioned process cartridge may be detachably installed on the main body of the image-forming apparatus. Above-mentioned process cartridge chip may include a first grounding portion and a second grounding portion electrically connected to the first grounding portion. The first grounding portion is configured to be connected to a reference-ground supply part (e.g., a part used for providing reference ground) disposed at the main body of the image-forming apparatus by electrically connecting to a first connecting part, in order to be connected to a potential reference point provided by the reference-ground supply part; and the second grounding portion is configured to be connected to the reference-ground supply part by electrically connecting to a second connecting part, where the first connecting part is different from the second connecting part, the second connecting part is not included in the first connecting part, and the first connecting part is not included in the second connecting part. That is, above-mentioned process cartridge chip may be disposed with two grounding portions electrically connected to each other, that is, the first grounding portion and the second grounding portion; and the first grounding portion may be connected to the reference-ground supply part disposed on the main body of the image-forming apparatus through the first connecting part, and the second grounding portion may be connected to the reference-ground supply part disposed on the main body of the image-forming apparatus through the second connecting part. The first connecting part may be different from the second connecting part; and there may be no mutually inclusive relationship between such two parts. That is, the first grounding portion and the second grounding portion may have different grounding paths for being connected to the potential reference point, so that the process cartridge chip may be connected to the potential reference point through two grounding paths. Even if the first grounding portion fails to be stably connected to the potential reference point through the first connecting part, since the first grounding portion is electrically connected to the second grounding portion, the first grounding portion may be still connected to the potential reference point through the second grounding portion which is grounded. Therefore, the process cartridge chip may be stably connected to the potential reference point, thereby improving grounding stability of the process cartridge chip and making the process cartridge chip less likely to be damaged.

FIG. 1 illustrates a structural schematic of a process cartridge chip provided by exemplary embodiments of the present disclosure. Above-mentioned process cartridge chip may be installed on the process cartridge, and the process cartridge may be detachably installed on the main body of the image-forming apparatus.

Above-mentioned process cartridge chip may include a first grounding portion 101 and a second grounding portion 102 electrically connected to the first grounding portion 101. The first grounding portion 101 may be configured to be connected to the reference-ground supply part disposed at the main body of the image-forming apparatus by electrically connecting to the first connecting part, in order to be connected to the potential reference point provided by the reference-ground supply part; and the second grounding portion 102 may be configured to be connected to the reference-ground supply part by electrically connecting to the second connecting part, where the first connecting part is different from the second connecting part, the second connecting part is not included in the first connecting part, and the first connecting part is not included in the second connecting part.

For example, in order to stabilize the grounding of the process cartridge chip, two grounding portions including the first grounding portion 101 and the second grounding portion 102 electrically connected to the first grounding portion 101 may be disposed on a process cartridge chip 100. When the process cartridge chip 100 is installed on the process cartridge and the process cartridge is detachably installed on the main body of the image-forming apparatus, the first grounding portion 101 of the process cartridge chip 100 may be connected to the reference-ground provide by electrically connecting to the first connecting part. For example, the reference-ground supply part may be a data board, a power board, or a sheet metal disposed on the main body of the image-forming apparatus. The second grounding portion 102 may be connected to the reference-ground supply part by electrically connecting to the second connecting part, such that the first grounding portion and the second grounding portion may be respectively connected to the potential reference point (i.e., grounding). The first connecting part and the second connecting part may be conductive connecting parts such as conductive contact springs, wires, conductive springs and the like.

It should be noted that the first grounding portion 101 and the second grounding portion 102 may be electrically connected inside the process cartridge chip 100 or may be electrically connected outside the process cartridge chip 100 through conductive connectors such as wires, which may not be limited in the present disclosure.

It should be noted that embodiments of the present disclosure may not limit the positions of the first grounding portion 101 and the second grounding portion 102 on the process cartridge chip 100, as long as it ensures that the first grounding portion 101 and the second grounding portion 102 may be respectively connected to the potential reference point through the reference-ground supply part. For example, a grounding contact may be disposed on each of the front and the back of the process cartridge chip 100. The first grounding portion 101 may be a grounding contact disposed on the front of the process cartridge chip 100, and the second grounding portion 102 may be a grounding contact disposed on the back of the process cartridge chip 100. The process cartridge chip 100 may be installed on the process cartridge through a chip bracket, and a conductive part may be disposed on the chip bracket for electrical connection with the second grounding portion 102. The surface of the chip bracket adjacent to the process cartridge chip 100 may be the front of the chip bracket, and the surface of the chip bracket away from the process cartridge chip 100 may be the back of the chip bracket. The surface of the chip bracket between the front and the back may be the side of the chip bracket. The conductive part may extend from the front to the side of the chip bracket. When the chip bracket is installed on the process cartridge, and the process cartridge may be installed on a drawer of the image-forming apparatus, the conductive part located on the side of the chip bracket may be adjoined with the drawer, and the drawer may be electrically connected to the sheet metal of the frame body in the image-forming apparatus. The drawer and the conductive part may be a part of the sheet metal of the image-forming apparatus, which may be configured as the reference-ground supply part, such that the second grounding portion 102 may be connected to the potential reference point. Obviously, the first grounding portion 101 and the second grounding portion 102 may also be disposed at other locations on the process cartridge chip 100, which may not be limited in the present disclosure.

It should be noted that when the first grounding portion 101 and the second grounding portion 102 are respectively connected to the potential reference point, the first grounding portion 101 and the second grounding portion 102 may be connected to the potential reference point through different paths. Therefore, although the first grounding portion and the second grounding portion are both connected to the potential reference point, it does not mean that the potentials of the first grounding portion and the second grounding portion are exactly same, and a certain potential difference may be between the first grounding portion and the second grounding portion. However, such potential difference may be relatively small and may not affect communication between the process cartridge chip 100 and the main body of the image-forming apparatus.

As an optional implementation, the second connecting part may include a preset analog circuit, that is, the second grounding portion 102 may be connected to the potential reference point through the preset analog circuit, and the preset analog circuit may be configured to generate a preset electrical signal.

For example, when the second grounding portion 102 is electrically connected to the preset analog circuit, the preset analog circuit may provide a same or similar voltage as the potential reference point, such that the potential difference between the second grounding portion 102 and the first grounding portion 101 may be 0 or relatively small.

Furthermore, such preset analog circuit may also include a power supply. The power supply may be configured to provide power to the preset analog circuit. The power supply may be a power supply part such as a battery or the like, or an energy storage part such as a capacitor, as long as it may provide power to the preset analog circuit, which may not be limited herein.

Optionally, the power supply and the reference-ground supply part may be electrically connected to each other, but the power supply and the reference-ground supply part may be at a same potential or have a certain potential difference.

As an optional implementation, the second grounding portion 102 may be electrically connected to or disconnected from the data signal contact (serial data or SDA) or the clock signal contact (clock or CLK) through a switch circuit. That is, the switch circuit may be configured to electrically connect or disconnect the second grounding portion 102 from the data signal contact or the clock signal contact. In an operating state, the switch circuit may be configured to disconnect the second grounding portion 102 from the data signal contact or the clock signal contact; and in a detection state, the switch circuit may be configured to electrically connect the second grounding portion 102 with the data signal contact or the clock signal contact. The switch circuit may include a switch configured to electrically connect or disconnect the second grounding portion 102 from the data signal contact or the clock signal contact. Furthermore, the switch circuit may also include a power supply part configured to supply power to the switch, such that the switch may be switched on and off in a controlled manner.

Furthermore, the second grounding portion 102 may also be electrically connected to the data signal contact point or the clock signal contact point through above-mentioned preset analog circuit.

As an optional implementation, the main body may be disposed with an electrical contact portion electrically connected to the reference-ground supply part. The first grounding portion may be configured to be electrically connected to the reference-ground supply part by electrically connecting to the electrical contact portion provided on the main body, in order to be connected to the potential reference point. The first connecting part may be the electrical contact portion.

Figure 2:
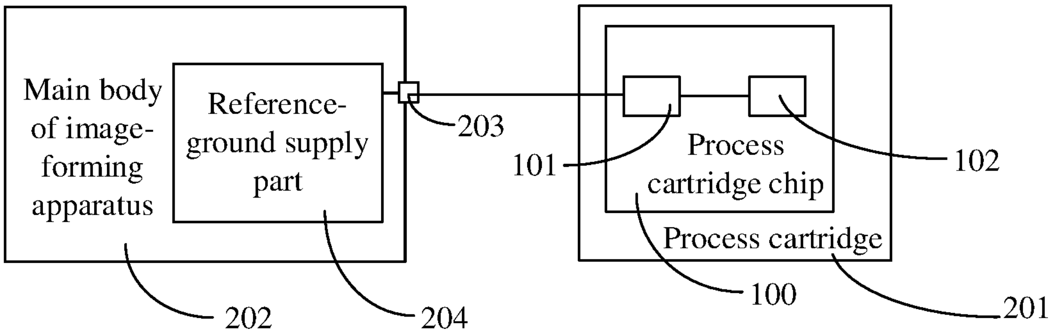
FIG. 2 illustrates another structural schematic of a process cartridge chip provided by exemplary embodiments of the present disclosure.

For example, the main body of the image-forming apparatus may be disposed with the electrical contact portion electrically connected to the reference-ground supply part. The first grounding portion 101 may be configured to be electrically connected to the reference-ground supply part by electrically connecting to the electrical contact portion, in order to be connected to the potential reference point. That is, the first grounding portion 101 may be directly electrically connected to the reference-ground supply part through the electrical contact portion. At this point, the first connecting part may be the electrical contact portion. For example, as shown in FIG. 2, the first grounding portion 101 may be disposed on the process cartridge chip 100, and the second grounding portion 102 may be disposed on the back of the process cartridge chip. When the process cartridge chip 100 is installed on a process cartridge 201 and the process cartridge 201 is detachably installed on a main body of the image-forming apparatus 202, the first grounding portion 101 of the process cartridge chip 100 may be electrically connected to a reference-ground supply part 204 by electrically connecting to an electrical contact portion 203 disposed on the main body of the image-forming apparatus 202.

Figure 3:
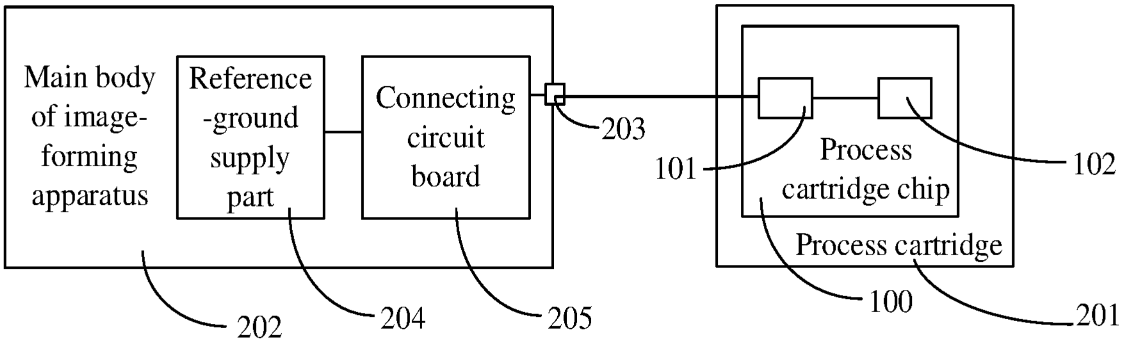
FIG. 3 illustrates another structural schematic of a process cartridge chip provided by exemplary embodiments of the present disclosure.

As an optional implementation, as shown in FIG. 3, the main body of the image-forming apparatus 202 may be also disposed with a connecting circuit board 205. The connecting circuit board 205 may be electrically connected to the electrical contact portion 203 and the reference-ground supply part 204 respectively. The first grounding portion 101 may be configured to be electrically connected to the reference-ground supply part 204 by electrically connecting to the electrical contact portion 203 and the connecting circuit board 205, in order to be connected to the potential reference point. The first connecting part may include the electrical contact portion 203 and the connecting circuit board 205.

For example, in the image-forming apparatus, the process cartridge chip may be electrically connected to the data board through the connecting circuit board. Therefore, the main body of the image-forming apparatus may also include the connecting circuit board 205. When the process cartridge chip 100 is installed on the process cartridge 201 and the process cartridge 201 is detachably installed on the main body of the image-forming apparatus 202, the first grounding portion 101 of the process cartridge chip 100 may be electrically connected to the electrical contact portion 203, and the electrical contact portion 203 may be electrically connected to the connecting circuit board 205, such that the first grounding portion 101 may be electrically connected to the reference-ground supply part 204. At this point, the reference-ground supply part 204 may be the data board. Since the data board may provide a potential reference point, the first grounding portion 101 may be regarded as grounding. That is, the first connecting part may include the electrical contact portion 203 and the connecting circuit board 205; and the first grounding portion 101 may be connected to the potential reference point through the electrical contact portion 203 and the connecting circuit board 205.

It should be noted that the image-forming apparatus may include an image-forming control unit. The image-forming control unit may be an SoC (System on Chip). The SoC is a miniature system including multiple system parts configured to control image-forming processing operations of the image-forming apparatus, for example, performing linear correction, noise reduction, bad pixel removal, detail enhancement and the like on the image data to improve image output quality. The image-forming control unit may be also configured to perform processing operations related to data transmission and reception, command transmission and reception, and engine control of printing images. For example, the image-forming control unit may send and receive data, print engine control commands, status and the like through an interface unit (including but not limited to a USB port, a wired network port, a wireless network port, other interface, and/or the like). The image-forming control unit may be a data board.

As an optional implementation, the reference-ground supply part 204 may include the image-forming control unit and/or the power supply unit.

For example, the reference-ground supply part 204 may include the image-forming control unit and/or the power supply unit. The power supply unit may be configured to supply power to the image-forming control unit, and the image-forming control unit may be configured to control the image-forming apparatus to form images. Both the image-forming control unit and the power supply unit may provide the potential reference point.

As an optional implementation, the reference-ground supply part 204 may include a first sheet metal part on the main body of the image-forming apparatus. The second grounding portion may be configured to be electrically connected to the reference-ground supply part by electrically connecting to the first sheet metal part on the main body of the image-forming apparatus. The second connecting part may include a first conductor for electrically connecting the second grounding portion and the first sheet metal part.

For example, since the first sheet metal part on the main body of the image-forming apparatus is grounded, the reference-ground supply part 204 may include the first sheet metal part on the main body of the image-forming apparatus. When the process cartridge chip is installed on the process cartridge and the process cartridge is detachably installed on the main body of the image-forming apparatus, the second grounding portion 102 may be configured to be connected to the potential reference point by electrically connecting to the first sheet metal part on the main body of the image-forming apparatus. The second grounding portion 102 may be electrically connected to the first sheet metal part on the main body through the first conductor to achieve grounding. At this point, the second connecting part may include the first conductor for electrically connecting the second grounding portion and the first sheet metal part.

As an optional implementation, the reference-ground supply part 204 may include the first sheet metal part on the main body, an installation base may be detachably installed on the main body, the installation base may include a plurality of accommodating portions for installing the process cartridges, and the installation base may include a second sheet metal part. The second grounding portion may be configured to, by electrically connecting to the second sheet metal part, be connected to the reference-ground supply part when the second sheet metal part is electrically connected to the first sheet metal part. The second connecting part may include a second conductor for electrically connecting the second grounding portion and the second sheet metal part.

For example, if the process cartridge disposed with the process cartridge chip 100 is installed on the main body of the image-forming apparatus, the installation base may be detachably installed on the main body of the image-forming apparatus. The installation base may include a plurality of accommodating portions for installing the process cartridges, and the process cartridges may be directly installed on the installation base. The main body of the image-forming apparatus may be disposed with the first sheet metal part, and the installation base may include the second sheet metal part. When the process cartridge disposed with the process cartridge chip 100 is installed on the installation base and the installation base is installed on the main body of the image-forming apparatus, the second sheet metal part and the first sheet metal part may be electrically connected to be conductive to each other. Since the first sheet metal part is grounded, the second sheet metal part may be grounded through the first sheet metal part. At this point, the second grounding portion 102 of the process cartridge chip 100 may be electrically connected to the second sheet metal part, thereby being electrically connected to the reference-ground supply part 204 (the first sheet metal part), such that the second grounding portion 102 of the process cartridge chip 100 may be connected to the potential reference point. The second connecting part may include the second conductor for electrically connecting the second grounding portion and the second sheet metal part.

Figure 4:
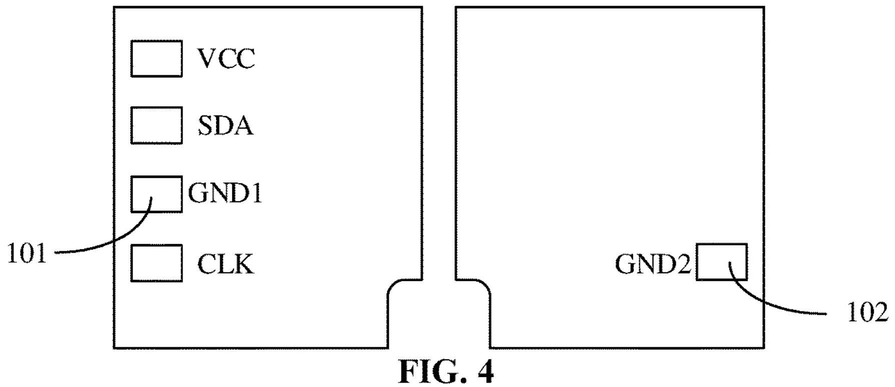
FIG. 4 illustrates another structural schematic of a process cartridge chip provided by exemplary embodiments of the present disclosure.
Figure 5:
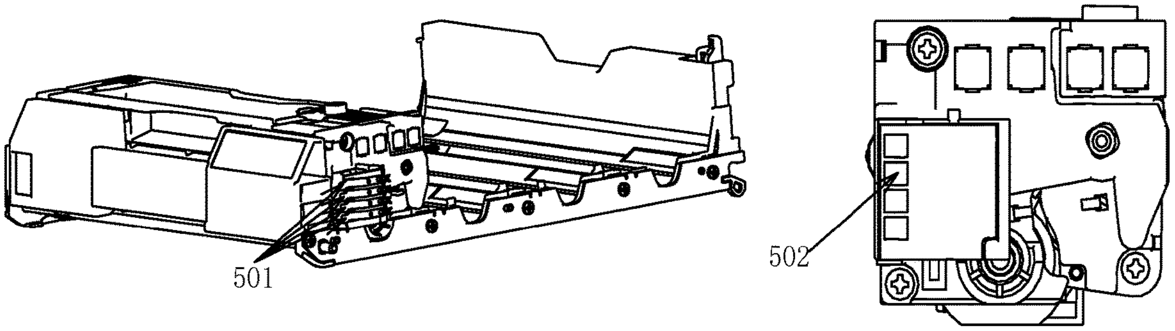
FIG. 5 illustrates another structural schematic of a process cartridge chip provided by exemplary embodiments of the present disclosure.
Figure 6:
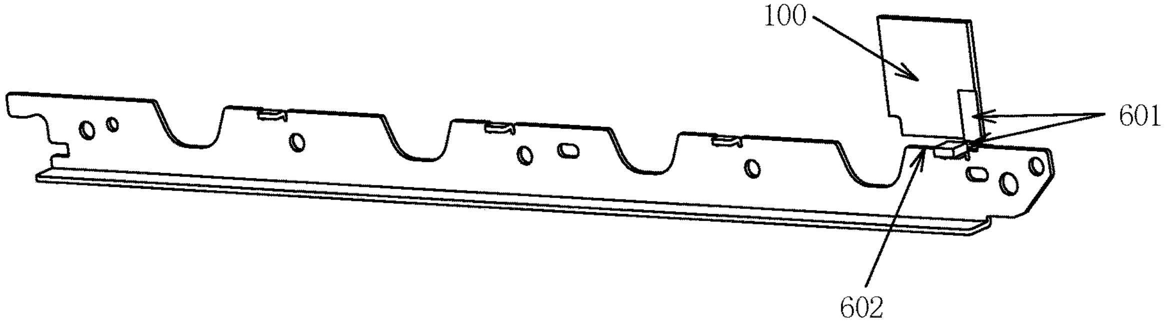
FIG. 6 illustrates another structural schematic of a process cartridge chip provided by exemplary embodiments of the present disclosure.

Exemplarily, it is assumed that the process cartridge chip 100 is the process cartridge chip as shown in FIG. 4, and four electrical contacts may be disposed on the front of the process cartridge chip 100 including a power contact (volt current condenser or VCC), a data signal contact (serial data or SDA), a clock signal contact (CLK) and a first grounding contact GND1; and the second grounding contact GND2 may be disposed on the back of the process cartridge chip 100. The first grounding contact GND1 and the second grounding contact GND2 may be electrically connected to each other inside the chip. As shown in FIG. 5, a chip contact elastic piece may be disposed on the main body of the image-forming apparatus, where the contact spring used for grounding may be the electrical contact portion. When the process cartridge chip 100 is installed on the process cartridge, and the process cartridge is installed on the installation base and loaded into the main body of the image-forming apparatus, chip contact elastic pieces 501 disposed on the main body of the image-forming apparatus may be electrically connected to four electrical contacts 502 on the front of the process cartridge chip 100, and the chip contact elastic piece 501 may be electrically connected to the reference-ground supply part (e.g., the image-forming control unit) through the connecting circuit board. At this point, the image-forming control unit may be the data board, and the data board may be fixed on the sheet metal of the frame body of the image-forming apparatus through locking screws. Since the sheet metal of the frame body of the image-forming apparatus is grounded, the data board may be grounded through the sheet metal of the frame body of the image-forming apparatus. Therefore, the grounding contact GND1 on the front of the process cartridge chip 100 may be grounded through the data board. As shown in FIG. 6, the grounding contact GND2 on the back of the process cartridge chip 100 may be electrically connected to one end of a conductive part 601, and the other end of the conductive part 601 may be electrically connected to a drawer sheet metal 602. At this point, the drawer sheet metal may be the second sheet metal part mentioned above. When the drawer sheet metal 602 is installed on the main body of the image-forming apparatus, the drawer sheet metal 602 may be in contact with the sheet metal of the frame body to achieve electrical connection, such that the drawer sheet metal 602 may be grounded through the sheet metal of the frame body. The sheet metal of the frame body may be the first sheet metal part, and the conductive part 601 may be the second conductor. Therefore, the second grounding contact GND2 on the back of the process cartridge chip 100 may be grounded by electrically connecting to the drawer sheet metal 602. In such way, the first grounding contact GND1 on the front of the process cartridge chip 100 may be grounded; and when the first grounding contact GND1 is grounded unstably through the data board, the first grounding contact GND1 may be grounded through the second grounding contact GND2 electrically connected thereto, thereby achieving stable grounding of the process cartridge chip.

As an optional implementation manner, the process cartridge chip 100 may further include a first grounding contact and a substrate; the first grounding contact may be disposed on the substrate; and the first grounding portion may be a part of the first grounding contact.

Figure 7:
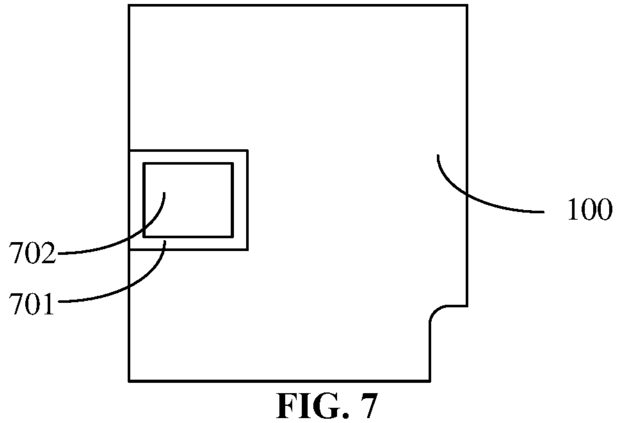
FIG. 7 illustrates another structural schematic of a process cartridge chip provided by exemplary embodiments of the present disclosure.

For example, in order to facilitate disposing the first grounding portion 101 and the second grounding portion 102, the first grounding contact and the substrate may be disposed on the process cartridge chip 100. As shown in FIG. 7, a first grounding contact 702 may be disposed on a substrate 701, and the first grounding portion 101 may be a part of the first grounding contact 702.

As an optional implementation manner, the second grounding portion 102 may be another part of the first grounding contact 702.

For example, as shown in FIG. 7, a substrate 701 may be disposed on the process cartridge chip 100, and the first grounding contact 702 may be disposed on the substrate 701. The first grounding portion 101 may be a part of the first grounding contact 702, and the second grounding portion 102 may be another part of the first grounding contact 702. In such way, the first grounding portion 101 may be electrically connected to the second grounding portion 102 without using additional conductive lines.

As an optional implementation manner, the second grounding portion 102 and the first grounding portion 101 may be respectively located on different surfaces of the substrate 701.

For example, according to actual needs, the second grounding portion 102 and the first grounding portion 101 may be disposed on different surfaces of the substrate 701, which may not be limited in the present disclosure.

Figure 8:
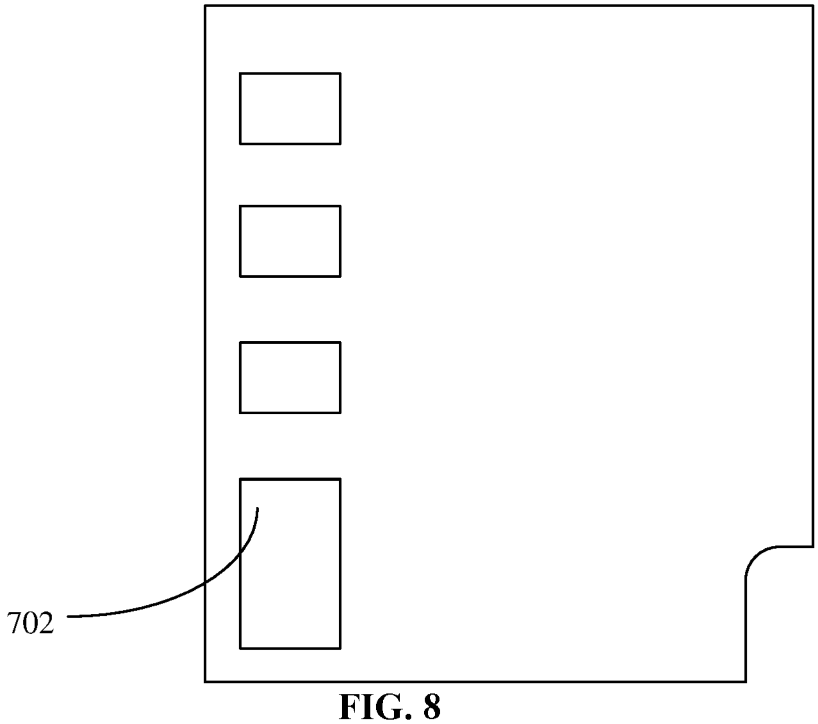
FIG. 8 illustrates another structural schematic of a process cartridge chip provided by exemplary embodiments of the present disclosure.
Figure 9:
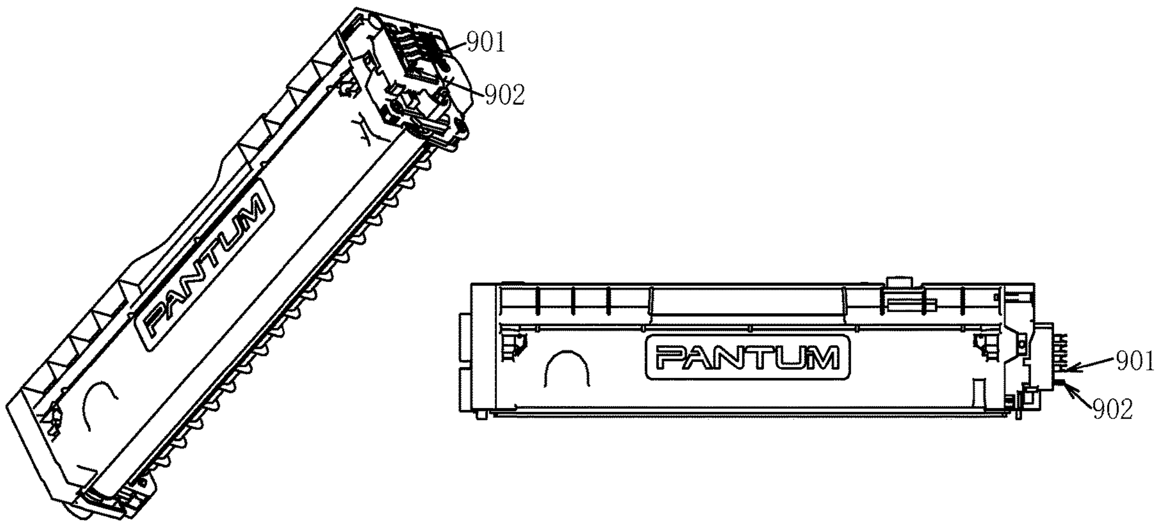
FIG. 9 illustrates another structural schematic of a process cartridge chip provided by exemplary embodiments of the present disclosure.

For example, as shown in FIG. 8, in order to facilitate electrical connection with other parts, the first grounding contact 702 of the process cartridge chip may be configured with a relatively large area. As shown in FIG. 9, a conductive contact elastic piece 901 (e.g., the electrical contact portion) and a conductive spring 902 may be disposed on the main body of the image-forming apparatus. When the process cartridge chip is installed on the process cartridge and the process cartridge is installed on the main body of the image-forming apparatus, the conductive contact elastic piece 901 may be in contact with a portion of the first grounding contact 702, such that the process cartridge chip may be electrically connected to the image-forming apparatus control unit disposed in the main body through the first grounding contact 702 to achieve grounding. The conductive spring 902 may be electrically connected to another portion of first grounding contact 702. In addition, since the conductive spring 902 is in contact with the sheet metal of the main body to be grounded, the process cartridge chip may be electrically connected to the conductive spring 902 through the first grounding contact 702 to achieve grounding.

Figure 10:
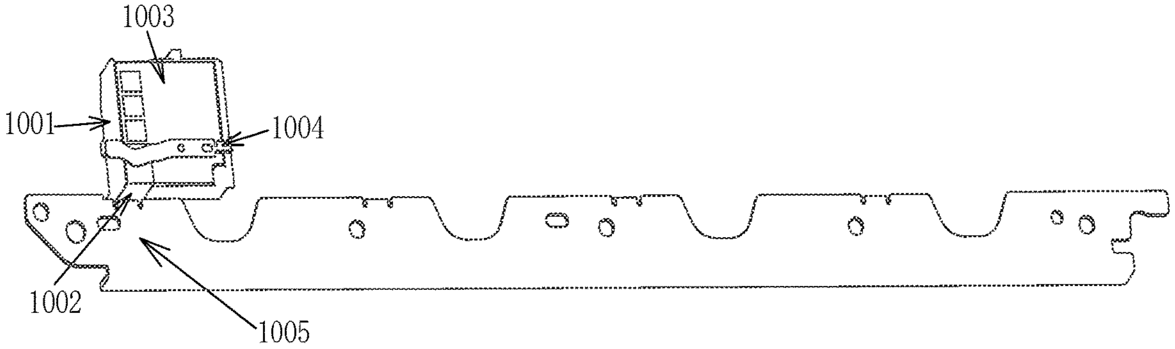
FIG. 10 illustrates another structural schematic of a process cartridge chip provided by exemplary embodiments of the present disclosure.

Furthermore, as shown in FIG. 10, a conductive part 1002 may be installed on a chip installation bracket 1001 of the process cartridge. One end of the conductive part 1002 may be in contact with the first grounding contact 702 of a process cartridge chip 1003; and a chip contact elastic piece 1004 (e.g., the electrical contact portion) on the main body may be in contact with one end of the conductive part 1002. Therefore, the process cartridge chip 1003 may be electrically connected to the image-forming apparatus control unit disposed in the main body to achieve grounding. When installation of the chip 1003 is completed, another end of the conductive part may be in contact with the drawer sheet metal 1005, such that the process cartridge chip may be grounded through the drawer sheet metal 1005.

Corresponding to above-mentioned embodiments, embodiments of the present disclosure further provide a process cartridge. The process cartridge may be detachably installed on the image-forming apparatus and include a process cartridge chip and a cartridge body. The process cartridge chip may be the process cartridge chip described in any one of above-mentioned embodiments.

Figure 11:
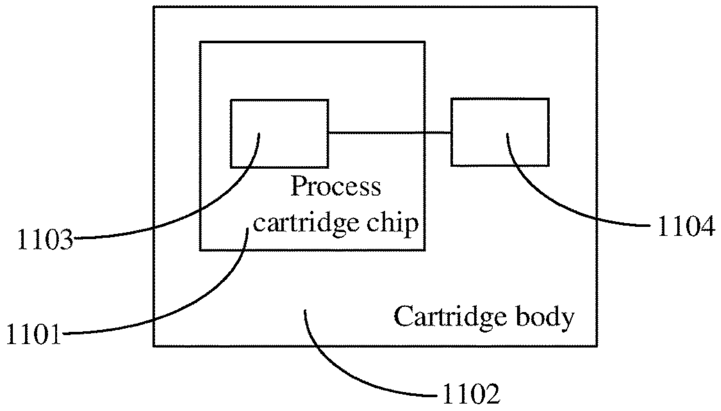
FIG. 11 illustrates a structural schematic of a process cartridge provided by exemplary embodiments of the present disclosure.

Corresponding to above-mentioned embodiments, embodiments of the present disclosure further provide a process cartridge. As shown in FIG. 11, above-mentioned process cartridge may include a process cartridge chip 1101 and a cartridge body 1102. The process cartridge chip 1101 may include a first grounding portion 1103, and the cartridge body 1102 may include a second grounding portion 1104; and the first grounding portion 1103 and the second grounding portion 1104 may be electrically connected to each other.

The first grounding portion 1103 may be configured to be connected to the reference-ground supply part disposed on the main body, by electrically connecting to the first connecting part, in order to be connected to the potential reference point provided by the reference-ground supply part.

The second grounding portion 1104 may be configured to be connected to the reference-ground supply part by electrically connecting to the third connecting part. The first connecting part may be different from the third connecting part, the third connecting part may be not included in the first connecting part, and the first connecting part may be not included in the third connecting part.

For example, in addition to disposing the second grounding portion on the process cartridge chip, since the process cartridge chip needs to be installed on the process cartridge for use, the second grounding portion may also be disposed on the main body of the process cartridge. Based on above, the process cartridge provided by embodiments of the present disclosure may include the process cartridge chip 1101 and the cartridge body 1102. The process cartridge chip 1101 may include the first grounding portion 1103, and the cartridge body 1102 may include the second grounding portion 1104; and the first grounding portion 803 may be electrically connected to the second grounding portion 1104. The first grounding portion 1103 may be connected to the potential reference point through the first connecting part; the second grounding portion 1104 may be connected to the potential reference point through the third connecting part; and the first grounding portion 1103 and the second grounding portion 1104 may be electrically connected to each other. Therefore, when the first grounding portion 1103 cannot be stably connected to the potential reference point, the first grounding portion 1103 may also be connected to the potential reference point through the second grounding portion 1104 connected to the potential reference point, such that the process cartridge chip 1101 may be grounded stably.

As an optional implementation, the main body may be disposed with an electrical contact portion electrically connected to the reference-ground supply part. The first grounding portion may be configured to be electrically connected to the reference-ground supply part by electrically connecting to the electrical contact portion provided on the main body, in order to be connected to the potential reference point. The first connecting part may be the electrical contact portion.

Figure 12:
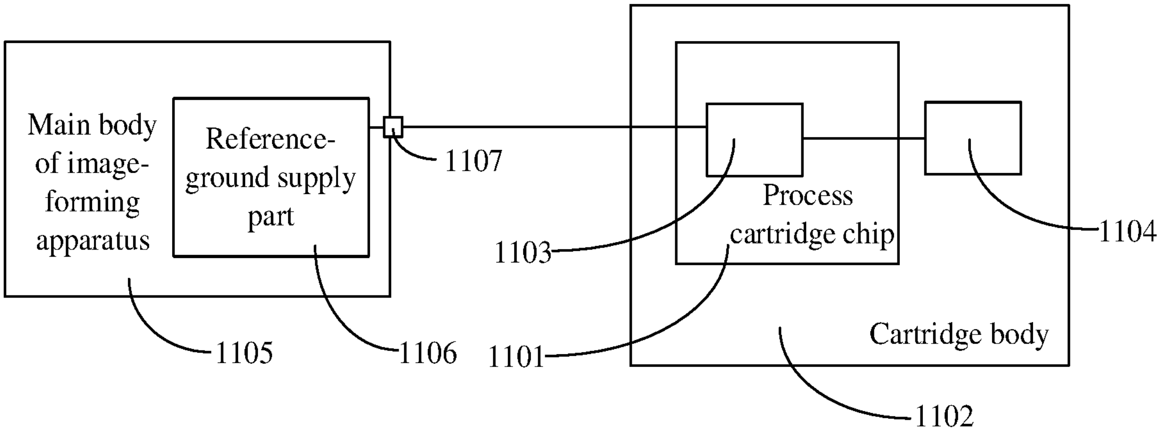
FIG. 12 illustrates another structural schematic of a process cartridge provided by exemplary embodiments of the present disclosure.

For example, as shown in FIG. 12, a main body of the image-forming apparatus 1105 may be configured with an electrical contact portion 1107 which is electrically connected to a reference-ground supply part 1106. The first grounding portion 1103 may be configured to be electrically connected to the reference-ground supply part by electrically connecting to the electrical contact portion, in order to be connected to the potential reference point. That is, the first grounding portion 1103 may be electrically connected to the reference-ground supply part through the electrical contact portion directly. At this point, the first connecting part may be the electrical contact portion. The first grounding portion 1103 of the process cartridge chip 1101 may be electrically connected to the reference-ground supply part 1106 by electrically connecting to the electrical contact portion 1107 disposed on the main body of the image-forming apparatus 1105.

Figure 13:
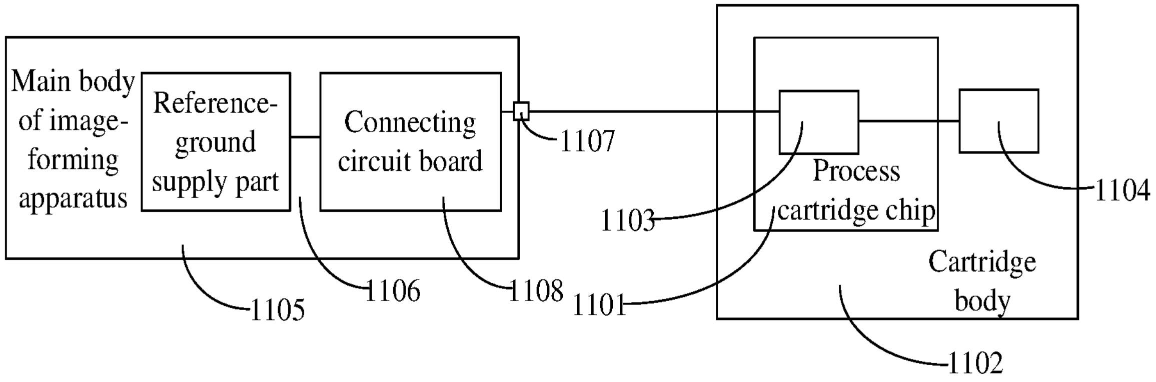
FIG. 13 illustrates another structural schematic of a process cartridge provided by exemplary embodiments of the present disclosure.

As an optional implementation, as shown in FIG. 13, the main body 1105 maybe also disposed with a connecting circuit board 1108. The connecting circuit board 1108 may be electrically connected to the electrical contact portion 1107 and the reference-ground supply part 1106, respectively. The first grounding portion 1103 may be configured to be electrically connected to the reference-ground supply part 1106 by electrically connecting to the electrical contact portion 1107 and the connecting circuit board 1108, in order to be connected to the potential reference point. The first connecting part 1103 may include the electrical contact portion 1107 and the connecting circuit board 1108.

For example, in the image-forming apparatus, the process cartridge chip may be electrically connected to the data board through the connecting circuit board. Therefore, the main body of the image-forming apparatus 1105 may also include the connecting circuit board 1108. When the process cartridge chip 1101 is installed on the process cartridge and the process cartridge is detachably installed on the main body of the image-forming apparatus 1105, the first grounding portion 1103 of the process cartridge chip 1101 may be electrically connected to the electrical contact portion 1107, and the electrical contact portion 1107 may be electrically connected to the connecting circuit board 1108. Therefore, the first grounding portion 1103 may be electrically connected to the reference-ground supply part 1106, thereby being connected to the potential reference point. That is, the first connecting part may include the electrical contact portion 1107 and the connecting circuit board 1108; and the first grounding portion 1103 may be connected to the reference-ground supply part 1106 through the electrical contact portion 1107 and the connecting circuit board 1108, in order to be connected to the potential reference point.

As an optional implementation manner, the reference-ground supply part may include an image-forming control unit and/or a power supply unit.

Figure 14:
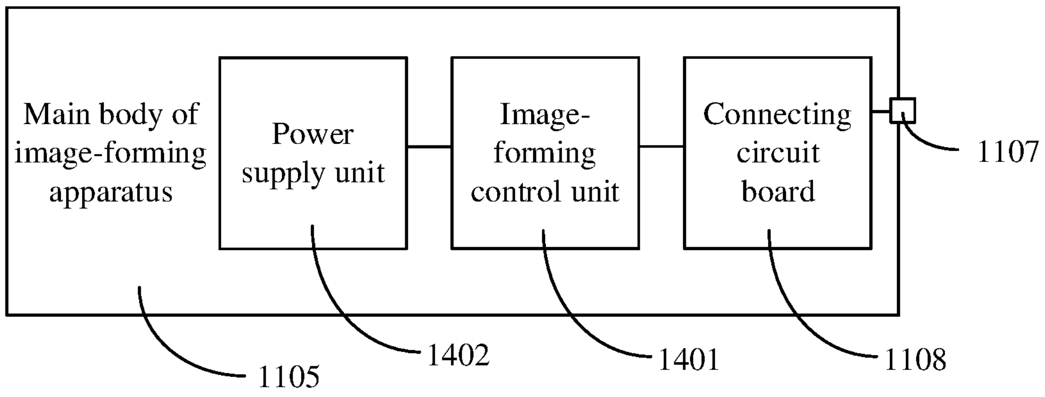
FIG. 14 illustrates a structural schematic of an image-forming apparatus provided by exemplary embodiments of the present disclosure.

For example, as shown in FIG. 14, the reference-ground supply part 1106 may include an image-forming control unit 1401 and/or a power supply unit 1402. The power supply unit 1402 may be configured to supply power to the image-forming control unit 1401, and the image-forming control unit 1401 may be configured to control the image formed by the image-forming apparatus. Both the image-forming control unit 1401 and the power supply unit 1402 may provide the potential reference point.

As an optional implementation manner, the reference-ground supply part may include the first sheet metal part on the main body of the image-forming apparatus; the second grounding portion may be configured to be electrically connected the reference-ground supply part by electrically connecting to the first sheet metal part on the main body of the image-forming apparatus; and the third connecting part may include a third conductor for electrically connecting the second grounding portion and the first sheet metal part.

For example, since the first sheet metal part on the main body of the image-forming apparatus is grounded, the reference-ground supply part 1106 may include the first sheet metal part on the main body of the image-forming apparatus. When the process cartridge is detachably installed on the main body of the image-forming apparatus, the second grounding portion 1104 on the cartridge body 1102 may be configured to be connected to the potential reference point by electrically connecting to the first sheet metal part on the main body of the image-forming apparatus. The second grounding portion 1104 may be electrically connected to the first sheet metal part on the main body through the first conductor to achieve grounding. At this point, the third connecting part may include the third conductor for electrically connecting the second grounding portion and the first sheet metal part.

As an optional implementation manner, the reference-ground supply part may include the first sheet metal part on the main body, the installation base may be detachably installed on the main body, the installation base may include a plurality of accommodating portions for the process cartridges, the installation base may include the second sheet metal piece, the second grounding portion may be configured to be electrically connected to the reference-ground supply part when the second sheet metal part is electrically connected to the first sheet metal part by electrically connecting to the second sheet metal part; and the third connecting part may include a fourth conductor for electrically connecting the second grounding portion and the second sheet metal part.

For example, if the process cartridge is installed in the main body of the image-forming apparatus, the installation base may be detachably installed on the main body of the image-forming apparatus. The installation base may include a plurality of accommodating portions for installing the process cartridges, and the process cartridge may be directly installed on the installation base. The main body of the image-forming apparatus may be disposed with the first sheet metal part, and the installation base may include the second sheet metal part. When the process cartridge is installed on the installation base on the main body of the image-forming apparatus, the second sheet metal part and the first sheet metal part may be electrically connected to be conductive to each other. Since the first sheet metal part is grounded, the second sheet metal part may be grounded through the first sheet metal part. At this point, the second grounding portion 1104 of the process cartridge chip 1101 in the process cartridge may be electrically connected to the second sheet metal part through the second conductor, thereby being electrically connected to the reference-ground supply part 1106 (e.g., the first sheet metal part). Therefore, the second connecting part 1104 of the process cartridge chip 1101 may be connected to the potential reference point. The second connecting part may include a fourth conductor for electrically connecting the second grounding portion and the second sheet metal part.

Corresponding to above-mentioned embodiments, embodiments of the present disclosure provide an image-forming apparatus including a main body and a process cartridge. Above-mentioned process cartridge may be the process cartridge described in any one of embodiments of FIGS. 11-14.

Figure 15:
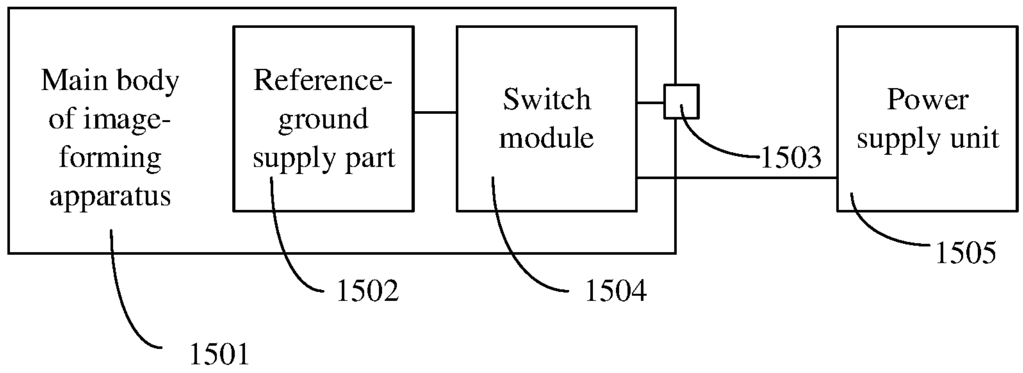
FIG. 15 illustrates another structural schematic of an image-forming apparatus provided by exemplary embodiments of the present disclosure.

Corresponding to above-mentioned embodiments, embodiments of the present disclosure provide another image-forming apparatus. As shown in FIG. 15, the image-forming apparatus may include a main body 1501; a reference-ground supply part 1502, configured to provide the potential reference point; an electrical contact portion 1503, where the electrical contact portion may be configured to be electrically connected to the electrical contact disposed on the process cartridge, and the process cartridge may be the process cartridge described in any one of embodiments of FIGS. 11-14; and a switch module 1504, where one end of the switch module 1504 may be electrically connected to the reference-ground supply part 1502 to be connected to the potential reference point provided by the reference-ground supply part 1502, and the other end of the switch module 1504 may be electrically connected to a power supply unit 1505 and electrically connected to the electrical contact portion 1503. Optionally, the electrical contact portion 1503 may be electrically connected to the first grounding portion 1103 on the process cartridge. At this point, the first grounding portion 1103 may be above-mentioned electrical contact.

Obviously, the electrical contact may also be another portion used for electrical connection with the image-forming apparatus.

For example, as shown in FIG. 15, the image-forming apparatus may include the body 1501, the reference-ground supply part 1502, the electrical contact portion 1503 and the switch module 1504. One end of the switch module 1504 may be electrically connected to the reference-ground supply part 1502 to be connected to the potential reference point provided by the reference-ground supply part 1502. The other end of the switch module 1504 may be electrically connected to the power supply unit 1505 and electrically connected to the electrical contact portion 1503. Through above image-forming apparatus, whether the process cartridge meets expectation may be detected, which is described hereinafter.

It should be noted that the power supply unit 1505 may be an external power supply or may be disposed in the image-forming apparatus, which may not be limited in present disclosure.

As an optional implementation, the reference-ground supply part 1502 may include the image-forming control unit. The image-forming control unit may be configured to obtain an electrical signal of the electrical contact portion and determine whether the electrical signal meets expectation when the switch module 1504 is in a disconnected state and configured to determine whether the process cartridge meets expectation when the electrical signal generated by the electrical contact portion meets expectation.

Figure 16:
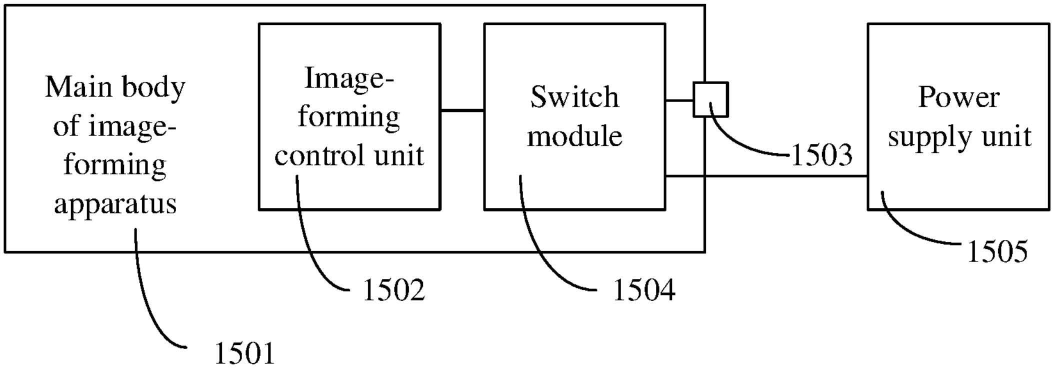
FIG. 16 illustrates another structural schematic of an image-forming apparatus provided by exemplary embodiments of the present disclosure.

For example, in the image-forming apparatus, the image-forming control unit may be configured to control the image-forming apparatus to form images. Furthermore, since the image-forming control unit is grounded through the sheet metal part of the main body of the image-forming apparatus, the reference-ground supply part may include the image-forming control unit 1502 as shown in FIG. 16. The image-forming control unit 1502 may be configured to obtain the electrical signal of the electrical contact portion 1503 and determine whether the electrical signal meets expectation when the switch module 1504 is in a disconnected state, and configured to determine whether the process cartridge meets expectation when the electrical signal generated by the electrical contact portion 1503 meets expectation. For example, the image-forming control unit 1502 may disconnect the switch module 1504 to disconnect the electrical contact portion 1503 from the image-forming control unit. When the process cartridge in any one of above-mentioned embodiments is installed on the image-forming apparatus, the electrical contact portion 1503 may be electrically connected to the first grounding portion of the process cartridge chip on the process cartridge. Therefore, if the first grounding portion is grounded stably, the potential of the electrical contact portion 1503 should be a low level even if the switch module is disconnected. That is, when the switch module 1504 is disconnected, the electrical signal of the electrical contact portion 1503 may be obtained; and according to the electrical signal of the electrical contact portion 1503, whether the electrical signal meets expectation may be determined, that is, whether the electrical signal is a low level may be determined. When the electrical signal generated by the electrical contact portion 1503 meets expectation, it determines that the process cartridge meets expectation. That is, when obtained electrical signal generated by the electrical contact portion 1503 is determined to be a low-level signal, it determines that the process cartridge is grounded stably.

Figure 17:
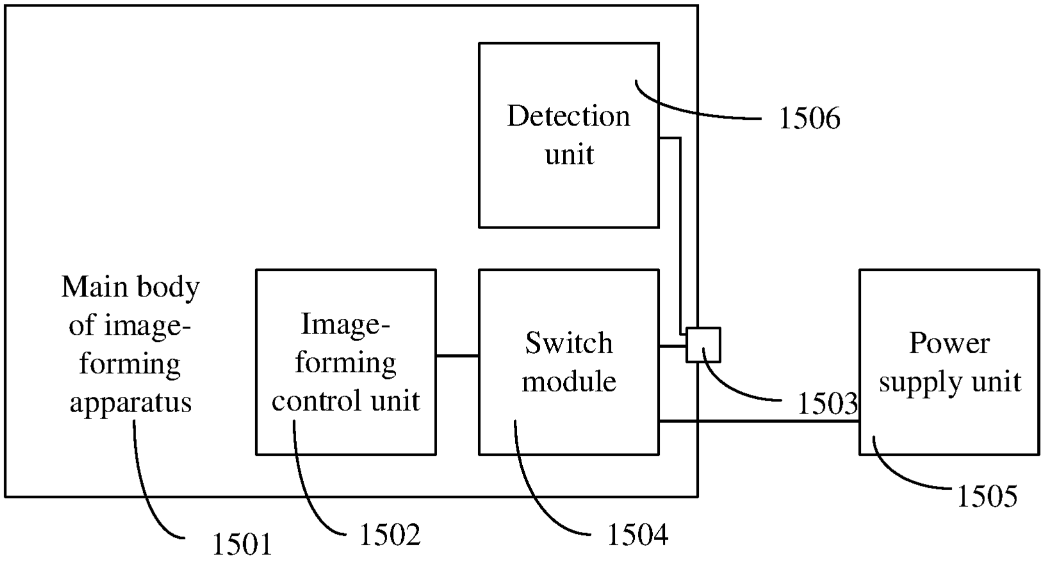
FIG. 17 illustrates another structural schematic of an image-forming apparatus provided by exemplary embodiments of the present disclosure.

As an optional implementation, as shown in FIG. 17, the image-forming apparatus may further include a detection unit 1506. The detection unit 1506 may be electrically connected to the electrical contact portion 1503 and configured to detect the electrical signal of the electrical contact portion 1503.

For example, in order to facilitate the detection of the electrical signal of the electrical contact portion 1503, the image-forming apparatus may be disposed with the detection unit 1506. As shown in FIG. 17, the detection unit 1506 may be electrically connected to the electrical contact portion 1503; and after the switch module 1504 is disconnected by the image-forming control unit 1502, the detection unit 1506 may detect the electrical signal of the electrical contact portion 1503.

As an optional implementation, both the switch module 1504 and the detection unit 1506 may be included in the image-forming control unit 1502.

Figure 18:
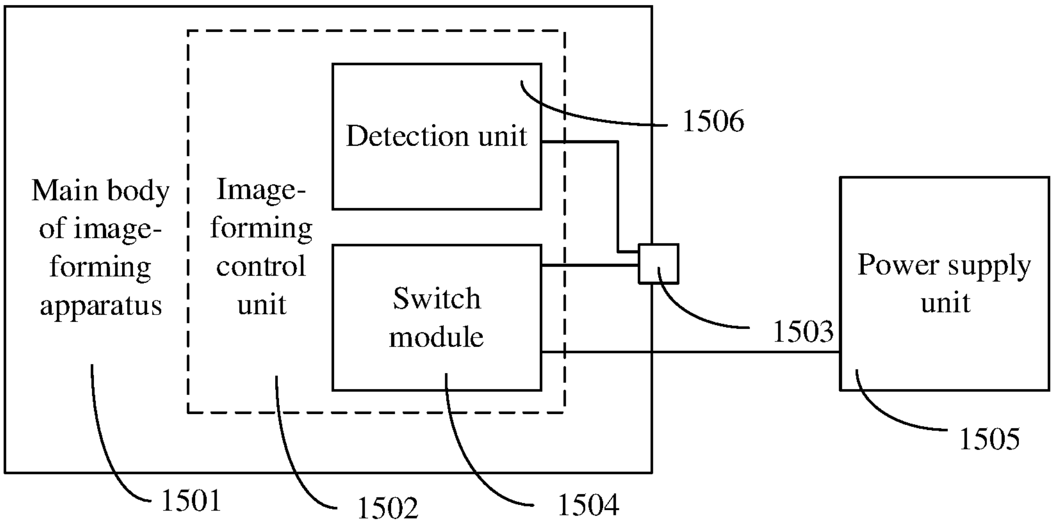
FIG. 18 illustrates another structural schematic of an image-forming apparatus provided by exemplary embodiments of the present disclosure.

For example, in order to save space, as shown in FIG. 18, the switch module 1504 and the detection unit 1506 may be integrated in the image-forming control unit 1502. At this point, both the switch module 1504 and the detection unit 1506 may be included in the image-forming control unit 1502.

As an optional implementation method, the main body 1501 may be also disposed with a connecting circuit board 1507. The connecting circuit board 1507 is electrically connected to the electrical contact portion 1503 and the image-forming control unit 1502 respectively. The switch module 1504 and the detection unit 1506 are included in the connecting circuit board 1507.

Figure 19:
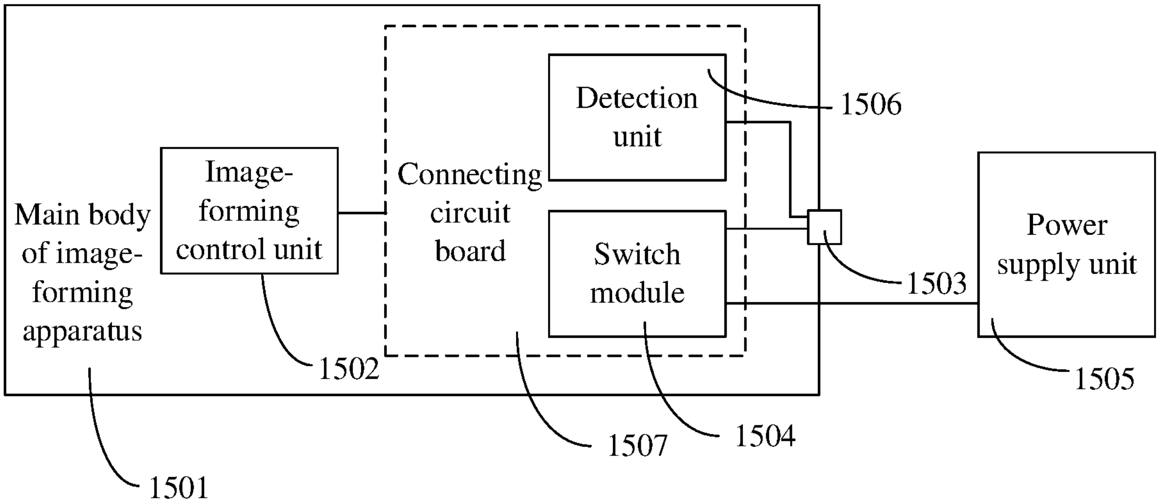
FIG. 19 illustrates another structural schematic of an image-forming apparatus provided by exemplary embodiments of the present disclosure.

For example, as shown in FIG. 19, the main body 1501 is also provided with a connecting circuit board 1507. The switch module 1504 and the detection unit 1506 may be integrated on the connecting circuit board 1507. The connecting circuit board 1507 may be electrically connected to the image-forming control unit 1502, thereby controlling the conduction and disconnection of the switch module 1504 in the connecting circuit board 1507.

Figure 20:
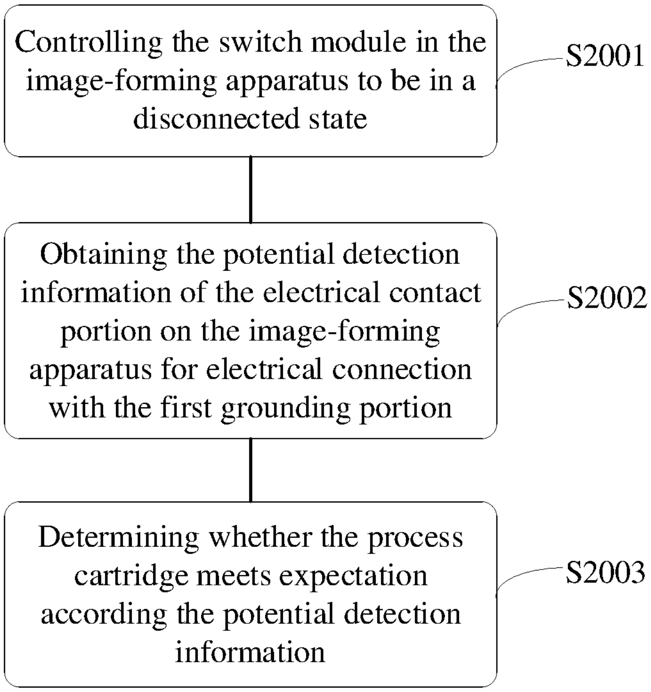
FIG. 20 illustrates a flowchart of a ground detection method provided by exemplary embodiments of the present disclosure.

Corresponding to above-mentioned embodiments, FIG. 20 illustrates a flowchart of a ground detection method provided by exemplary embodiments of the present disclosure. Above-mentioned ground detection method may be applied to the image-forming apparatus described in any one of above-mentioned embodiments, and above-mentioned method may include following exemplary steps.

At S2001, the switch module in the image-forming apparatus may be controlled to be in a disconnected state, such that the connection between the first grounding portion of the process cartridge chip of the process cartridge installed on the image-forming apparatus and the potential reference point provided by the reference-ground supply part provided on the image-forming apparatus may be disconnected.

For example, when performing chip ground detection, the image-forming apparatus may control the switch module inside the image-forming apparatus to be disconnected; and when the switch module is disconnected, the connection between the first grounding portion of the process cartridge chip of the process cartridge installed on the image-forming apparatus and the potential reference point provided by the reference-ground supply part disposed on the image-forming apparatus may be disconnected.

It should be noted that above-mentioned process cartridge chip may be the process cartridge chip in any one of above-mentioned embodiments, and above-mentioned process cartridge may be the process cartridge in any of above-mentioned embodiments.

At S2002, the potential detection information of the electrical contact portion on the image-forming apparatus for electrical connection with the first grounding portion may be obtained.

For example, since the switch module is disconnected, the connection between the electrical contact portion on the image-forming apparatus and the potential reference point provided by the reference-ground supply part may be disconnected. At this point, the electrical contact portion may be also electrically connected to the first grounding portion of the process cartridge chip to obtain the potential detection information of the electrical contact portion.

At S2003, according to the potential detection information, whether the process cartridge meets expectation may be determined.

For example, the electrical contact portion may be electrically connected to the first grounding portion of the process cartridge chip. The first grounding portion of the process cartridge chip cannot be electrically connected to the reference-ground supply part through the electrical contact portion to achieve grounding. However, the second grounding portion may be grounded through the sheet metal in the image-forming apparatus, and the first grounding portion and the second grounding portion may be electrically connected to each other. Therefore, if the process cartridge chip in the process cartridge is grounded stably, the first grounding portion of the process cartridge chip may still be grounded through the second grounding portion of the process cartridge chip. At this point, the electrical contact portion may still be grounded through the first grounding portion. As disclosed above, based on the potential detection information, whether the process cartridge meets expectation may be determined, which is described hereinafter.

Furthermore, determining whether the process cartridge meets expectation according to the potential detection information as mentioned above may include that if the potential detection information is a high level, it determines that the process cartridge does not meet expectation; and if the potential detection information is a low level, it determines that the process cartridge meets expectation.

For example, if detected potential detection information is a high level, it indicates that the electrical connection between the first grounding portion and the second contact portion at the process cartridge chip in the process cartridge may be unstable; or the second contact portion may be grounded unstably; or other unstable grounding conditions may occur. At this point, it determines that the process cartridge does not meet expectation. If detected potential detection information is a low level, it indicates that the first grounding portion and the second contact portion of the process cartridge chip in the process cartridge may be stably grounded. At this point, it determines that the process cartridge meets expectation. In such way, through above-mentioned ground detection method, whether the process cartridge is grounded stably may be detected.

Figure 21:
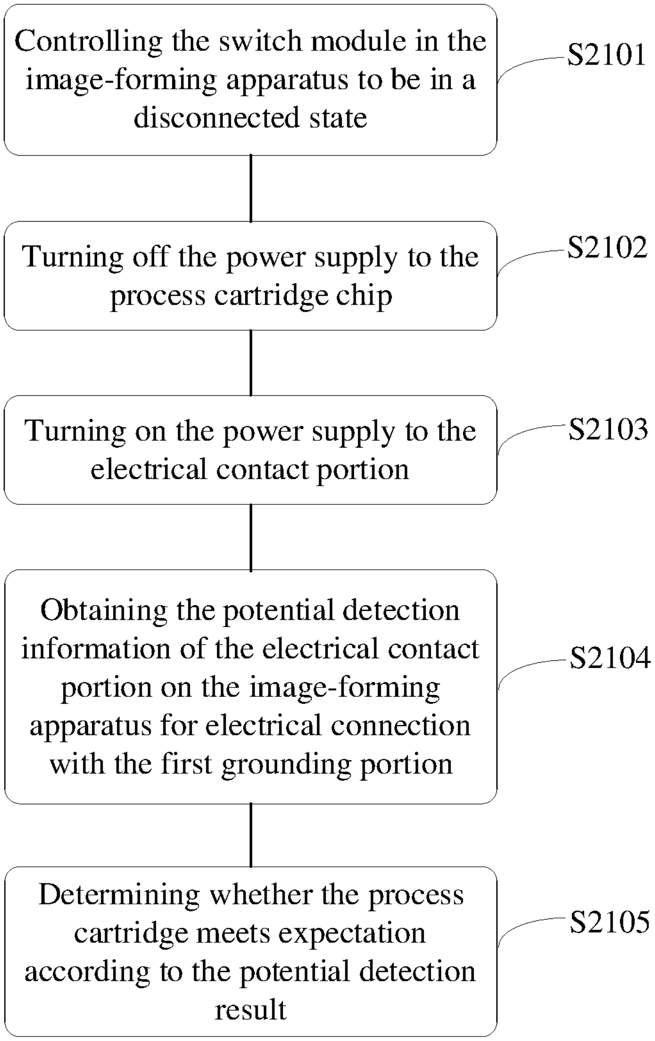
FIG. 21 illustrates another flowchart of a ground detection method provided by exemplary embodiments of the present disclosure.

FIG. 21 illustrates another flowchart of a ground detection method provided by exemplary embodiments of the present disclosure. Above-mentioned ground detection method may be applied to the image-forming apparatus, and above-mentioned method may include following exemplary steps.

At S2101, the switch module in the image-forming apparatus may be controlled to be in a disconnected state, such that the connection between the first grounding portion of the process cartridge chip of the process cartridge installed on the image-forming apparatus and the potential reference point provided by the reference-ground supply part disposed on the image-forming apparatus may be disconnected, which may refer to above-mentioned S2001 and may not be described in detail herein.

At S2102, the power supply to the process cartridge chip may be turned off.

For example, in order to improve the safety of the detection process, before obtaining the potential detection information of the electrical contact portion, the power supply to the process cartridge chip may be turned off.

At S2103, the power supply to the electrical contact portion may be turned on.

For example, in order to improve detection accuracy, before obtaining the potential detection information of the electrical contact portion, the power supply of the electrical contact portion may be turned on to provide a high-level signal to the electrical contact portion. However, if the process cartridge is grounded stably, the electrical contact may still be at a low level at this point, thereby improving detection accuracy.

It should be noted that above-mentioned S2102 may be executed first, and then above-mentioned S2103 may be executed; or above-mentioned S2103 may be executed first, and then above-mentioned S2102 may be executed.

At 52104, the potential detection information of the electrical contact portion on the image-forming apparatus for electrical connection with the first grounding portion may be obtained, which may refer to above-mentioned S2002 and may not be described in detail herein.

At 52105, whether the process cartridge meets expectation may be determined according to the potential detection result, which may refer to above-mentioned S2003 and may not be described in detail herein.

Corresponding to above-mentioned embodiments, embodiments of the present disclosure provide an image-forming control apparatus including an image-forming control unit. Above-mentioned image-forming control unit may be configured to execute exemplary steps of the ground detection method described in any one of embodiments in FIG. 20 or FIG. 21.

Corresponding to above-mentioned embodiments, embodiments of the present disclosure provide a computer-readable storage medium. The computer program may be stored on the computer-readable storage medium. When the computer program is executed by the processor, exemplary steps of the ground detection method as described in any one of embodiments in FIG. 20 or 21 may be implemented. Above-mentioned computer-readable storage media may be magnetic disks, optical disks, read-only memory (ROM) or random access memory (RAM), and the like.

Those skilled in the art may clearly understand that the technology in embodiments of the present disclosure may be implemented by means of software plus the necessary general hardware platform. Based on such understanding, essence of the technical solutions in embodiments of the present disclosure or a part of the technical solutions that contributes to the existing technology may be embodied in the form of software products. The computer software products may be stored in storage media such as ROM/RAM, magnetic disks, optical disks and the like, and may include a plurality of instructions for causing a computer device (e.g., a personal computer, a server, or a network device or the like) to execute above-mentioned methods of various embodiments or some parts of embodiments of the present disclosure.

Same and similar parts among the various embodiments in the present disclosure may be referred to each other. In particular, since apparatus embodiments and terminal embodiments are basically similar to method embodiments, the description of the apparatus embodiments and the terminal embodiments may be relatively simple. Relevant details thereof may refer to the description in the method embodiments.

What is claimed is:

1. A process cartridge chip, installed on a process cartridge, wherein the process cartridge is detachably installed on a main body of an image-forming apparatus, comprising:

a first grounding portion and a second grounding portion electrically connected to the first grounding portion, wherein:

the first grounding portion is connected to a reference-ground supply part disposed at the main body of the image-forming apparatus by electrically connecting to a first connecting part, in order to be connected to a potential reference point provided by the reference-ground supply part, the first connecting part including an electrical contact portion disposed on the main body of the image-forming apparatus; and the second grounding portion is connected to the reference-ground supply part by electrically connecting to a second connecting part, wherein the first connecting part is different from the second connecting part, the second connecting part is not included in the first connecting part, and the first connecting part is not included in the second connecting part, the second connecting part including a conductive part disposed on the process cartridge.

2. The process cartridge chip according to claim 1, wherein:

the electrical contact portion is electrically connected to the reference-ground supply part; and the first grounding portion is electrically connected to the reference-ground supply part by electrically connecting to the electrical contact portion disposed on the main body of the image-forming apparatus, in order to be connected to the potential reference point.

3. The process cartridge chip according to claim 2, wherein:

the main body of the image-forming apparatus is further disposed with a connecting circuit board; the connecting circuit board is electrically connected to the electrical contact portion and the reference-ground supply part respectively; the first grounding portion is electrically connected to the reference-ground supply part by electrically connecting to the electrical contact portion and the connecting circuit board, in order to be connected to the potential reference point; and the first connecting part includes the electrical contact portion and the connecting circuit board.

4. The process cartridge chip according to claim 1, wherein:

the reference-ground supply part includes an image-forming control unit and/or a power supply unit.

5. The process cartridge chip according to claim 1, wherein:

the reference-ground supply part includes the first sheet metal part on the main body of the image-forming apparatus; the main body of the image-forming apparatus is detachably installed with an installation base including a plurality of accommodating portions for installing process cartridges; the installation base includes a second sheet metal part; when the second sheet metal part is electrically connected to the first sheet metal part, the second grounding portion is electrically connected to the reference-ground supply part by electrically connecting to the second sheet metal part; and the second connecting part includes the conductive part for electrically connecting the second grounding portion to the second sheet metal part.

6. The process cartridge chip according to claim 1, further including:

a first grounding contact and a substrate, wherein the first grounding contact is disposed on the substrate, and the first grounding portion is a portion of the first grounding contact.

7. The process cartridge chip according to claim 6, wherein:

the second grounding portion is another portion of the first grounding contact.

8. The process cartridge chip according to claim 6, further including:

a second grounding contact different from the first grounding contact, wherein the second grounding contact is disposed on the substrate, and the second grounding portion is a portion of the second grounding contact.

9. The process cartridge chip according to claim 8, wherein:

the second grounding portion and the first grounding portion are respectively on different surfaces of the substrate.

10. A process cartridge, detachably installed on a main body of an image-forming apparatus, comprising:

a process cartridge chip and a cartridge body, wherein the process cartridge chip, installed on the process cartridge, includes a first grounding portion and a second grounding portion electrically connected to the first grounding portion, wherein:

the first grounding portion is connected to a reference-ground supply part disposed at the main body of the image-forming apparatus by electrically connecting to a first connecting part, in order to be connected to a potential reference point provided by the reference-ground supply part, the first connecting part including an electrical contact portion disposed on the main body of the image-forming apparatus; and the second grounding portion is connected to the reference-ground supply part by electrically connecting to a second connecting part, wherein the first connecting part is different from the second connecting part, the second connecting part is not included in the first connecting part, and the first connecting part is not included in the second connecting part, the second connecting part including a conductive part disposed on the process cartridge.

* * * * *